United States Patent Office 3,718,922
Patented Feb. 27, 1973

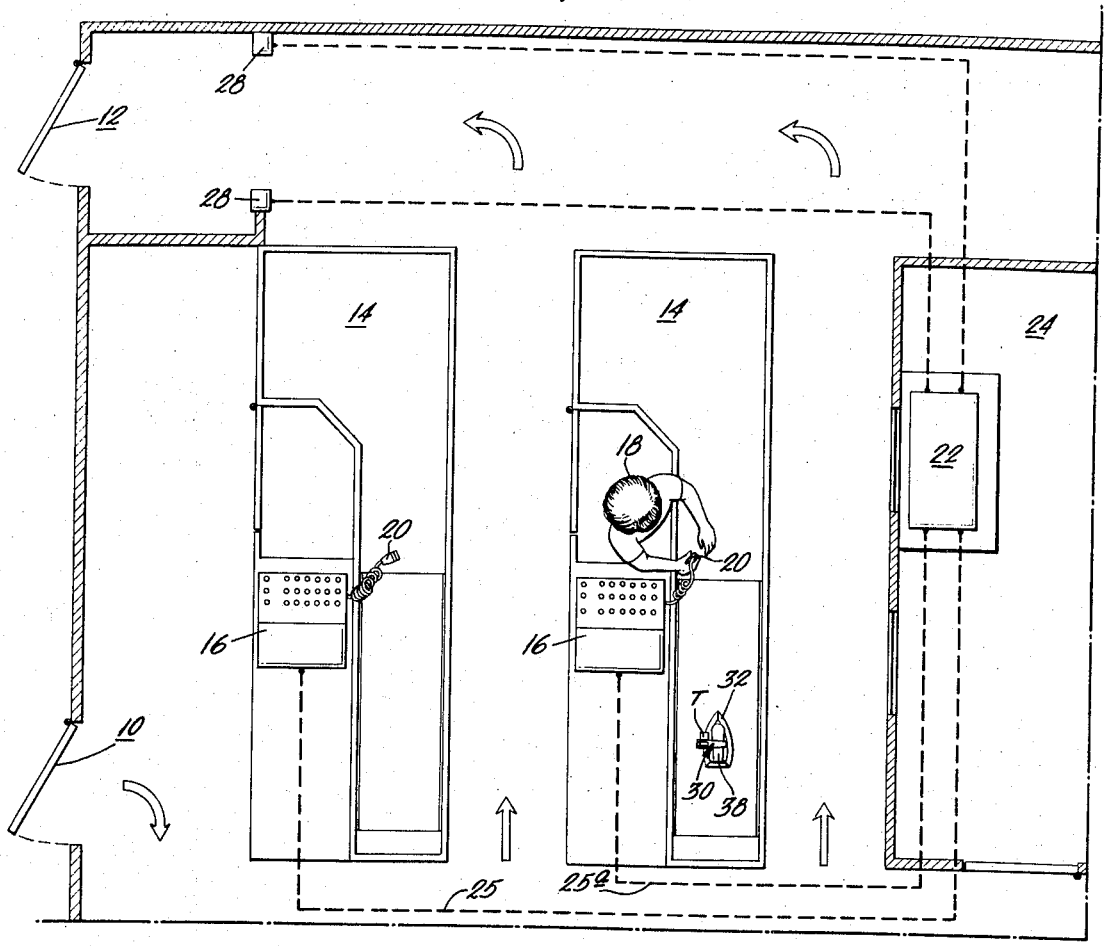
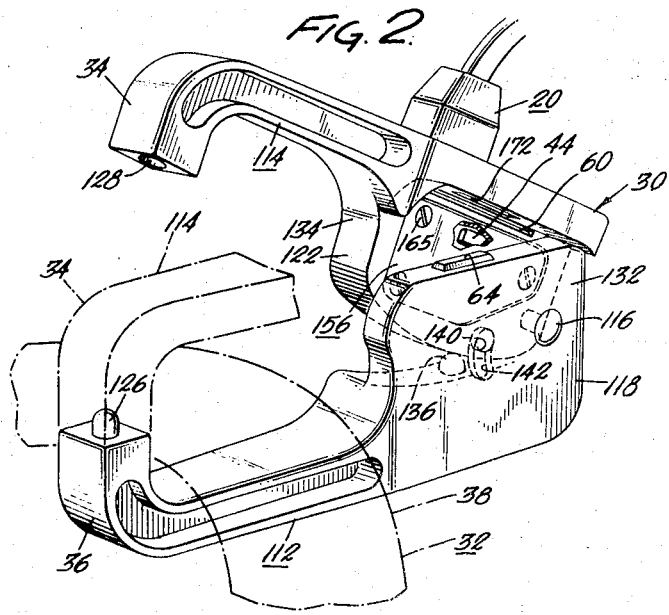
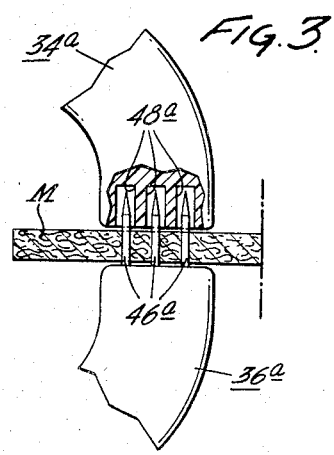

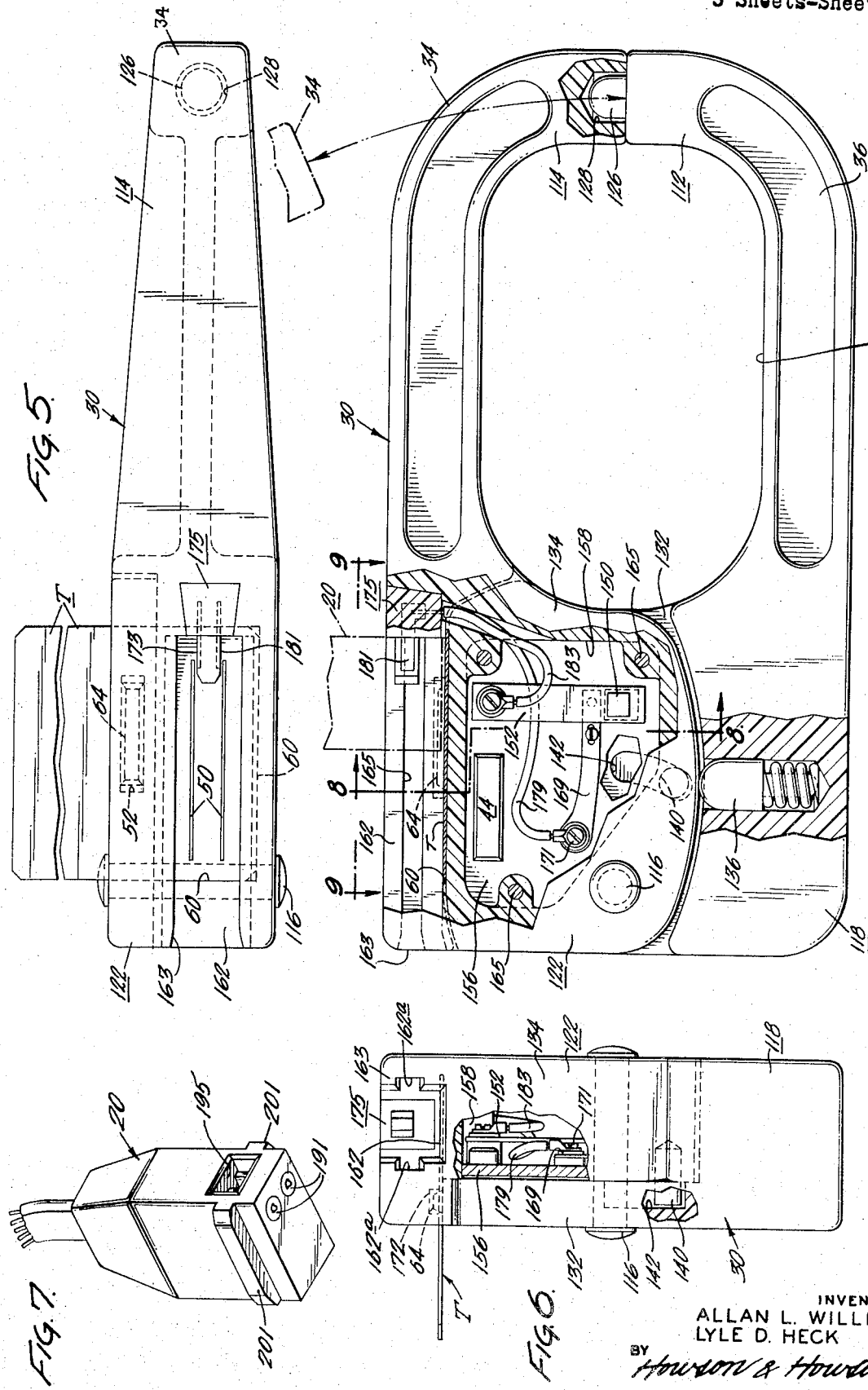

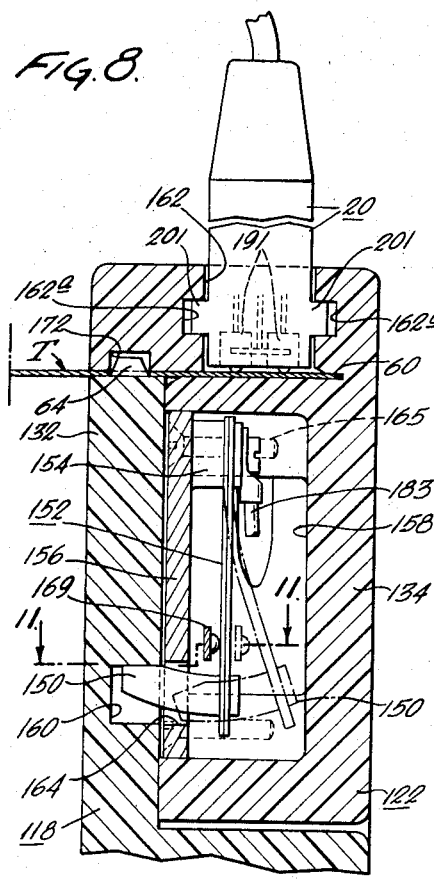
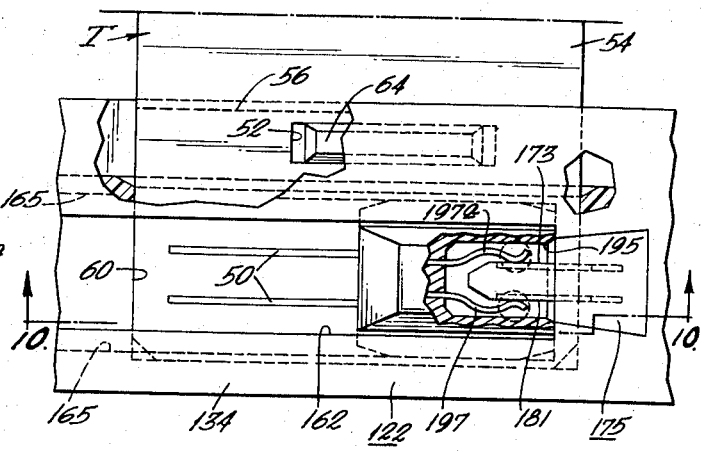
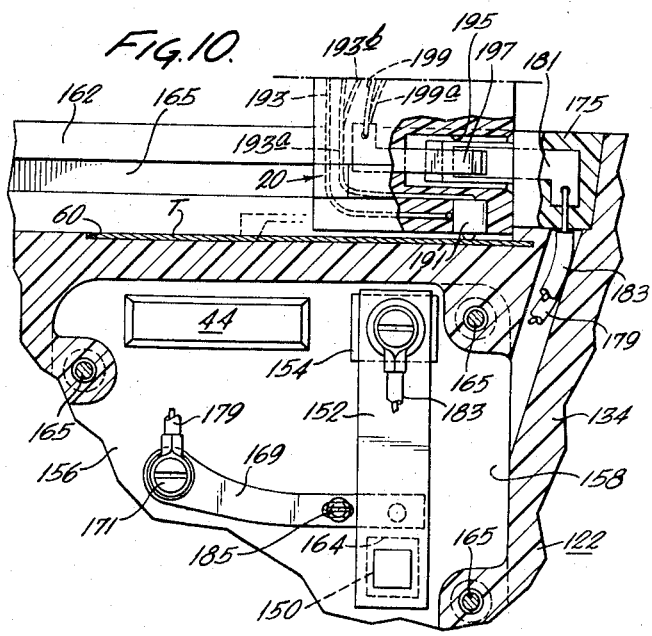
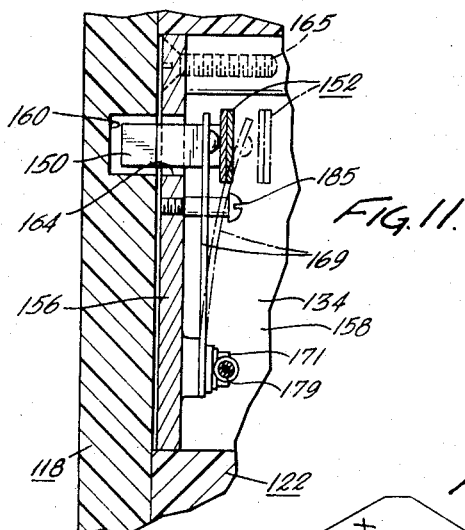
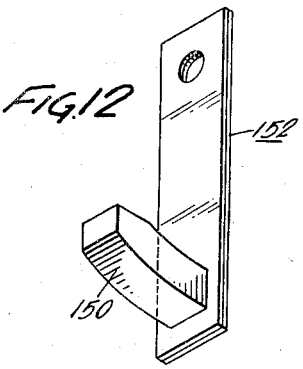

3,718,922
PRODUCT MONITORING APPARATUS,
SYSTEM AND METHOD
Allan L. Williams, 2620 Cumberland Ave., Mount Penn, Pa. 19606, and Lyle D. Heck, Reading, Pa.; said Heck assignor to said Williams
Filed Feb. 3, 1971, Ser. No. 112,355
Int. Cl. G08b 13/14
U.S. Cl. 340—280
18 Claims

ABSTRACT OF THE DISCLOSURE

Thefts of products from a store are prevented and records of sales of the products automatically obtained by means of an electrically releasable locking device which is secured to each product, which is readily detected by detection apparatus near the exits from the store, which can be released from the product by application thereto of an electrically-powered key, and which may contain data relating to the product which are read out automatically in the form of electrical signals to an appropriate electrical data-processing unit when the key is applied to unlock the locking device. Preferably the unlocking is produced by heating a bimetallic element within the unlocking device with electrical current applied by way of the key. The data relating to the product are stored in the locking device in coded form along a keyway therein, and as the key is moved along the keyway toward its unlocking position it causes read-out of the data to the data processing unit. The substrate bearing the data has an external portion protruding outside the locking device, on which portion there may be provided visually-observable information about the product.

BACKGROUND OF THE INVENTION

It is well known that the unauthorized removal of products from supervised premises, whether due to intentional theft or to inadvertence, is producing a large dollar value of losses to merchants, the most common cases being intentional shoplifting of goods and thefts by employees. Such losses are believed now to be at the rate of billions of dollars.

Another problem commonly encountered in merchandising operations is that of keeping accurate and current records and acounts of such things as the inventory of goods on hand and the sales volume of particular goods, both in number and dollar volume. Such information is, of course, highly useful for accounting, inventory control and pricing purposes, for example.

Systems have been proposed in the prior art for enabling detection of unauthorized removal of products from premises by associating with the product some detectable signal-producing means which, when taken past a detection station without authorization, will produce a suitable alarm; for example, small radio transmitters, magnetic devices, and passive tuned electrical circuits have been secured in or on products for such purposes. In general, such known devices have generally suffered from one or more of the drawbacks of excessive bulk, expense, unreliability, inconvenience of attachment to different types of goods, difficulty of removal, or offensiveness to the buying public.

Sales monitoring and inventory control apparatus and methods are also known in the prior art in acordance with which data, such as identifying data as to the nature of the product and its price, are secured to the product and read off by a sales register operator, who may insert the information manually into some record-keeping device. However, such an arrangement relies upon the accuracy, reliability and attentiveness of the register operator, generally requires special mechanical equipment at each register, and, since the operation requires a substantial amount of time, results in slowing down of the processing of sales at the register.

Accordingly, it is an object of the invention to provide new and useful system, apparatus and method for the detection of unauthorized removal of products from a predetermined location.

Another object is to provide such system, apparatus and method which is inexpensive and easy to employ, but difficult for the thief or shoplifter to defeat.

Another object is to provide a new and useful system, apparatus and method for monitoring data as to products upon their authorized removal from the premises.

A further object is to provide such system, apparatus and method which are largely automatic in their operation, highly accurate, and easily applied to a large variety of products.

Another object is to provide new and useful apparatus, system and method which provide both detection of the unauthorized removal of products from premises and monitoring of data as to products which are removed with authorization, as by sale thereof.

A further object is to provide such system, apparatus and method by means of which accounting or sales data respecting the product are automatically derived in the act of removal of a previously-applied locking device from the product.

Another object is to provide a new and useful locking device for use on products, which locking device is difficult for a thief to unlock on the premises.

Another object is to provide such a locking device which is inexpensive and reliable in operation.

Another object is to provide such a locking device into which data relating to the product can be inserted at will, so as to be read out from the locking device as the device is unlocked.

Another object is to provide such a locking device which provides for the insertion therein of different data with respect to different products to which it may be attached, and which also provides for the visual display of data as to the product prior to unlocking of the locking device.

BRIEF SUMMARY OF THE INVENTION

In accordance with the invention, these and other objects are achieved by the provision of a system in which a locking device is secured to each product on the premises to be made secure against theft, and detection stations are provided at one or more check points on the premises so that if one attempts to remove a product having a locking device secured thereto past the check point, an alarm indication will be given. The locking device is releasable by means of an electrified key maintained on the premises for this purpose, for example at a sales register, which key is effective when applied to the locking device to release it and permit the unchallenged removal of the product from the premises.

According to one aspect of the invention, the locking device is releasable only by the application thereto of electrical current from the key, and in accordance with a further feature of the invention the locking device is provided with a keyway along which data-representing indicia are arranged so as to be automatically read out, and to produce data-representing electrical signals, as the key is moved along the keyway into its operative unlocking position. In this preferred form of the invention, the key therefore provides not only electrical release of the locking device but also automatic electrical read-out of indicia relating to the product.

Further in accordance with the invention in one aspect, the unlocking of the locking device is provided by heating of a bimetallic element in the locking device in response to the electrical current supplied thereto from the key, the bimetallic element when heated moving to a position such as to effect the desired unlocking.

In a preferred embodiment, the data-representing indicia are provided within the locking device on a removable tag, the indicia-bearing portion of the tag being inserted into the locking device when it is opened and clamped therein by the closure of the locking device; preferably also, the tag has a portion which is retained externally of the locking device when closed, and on which visible information, such as printed or handwritten price information, may be inscribed for viewing by a customer or salesman, for example.

BRIEF DESCRIPTION OF FIGURES

These and other objects and features of the invention will be more readily understood from a consideration of the following detailed description, taken in connection with the accompanying drawings, in which:

FIG. 1 is a schematic plan view of the check-out, entrance and exit areas of premises on which the method, apparatus and system of the invention are to be employed, in one representative example thereof;

FIG. 2 is a perspective view of one embodiment of a locking device in accordance with the invention;

FIG. 3 is a fragmentary sectional view, partly in full, illustrating one modification of a portion of the locking device of FIG. 2, suitable for certain applications thereof;

FIG. 4 is a side elevational view of the locking device with portions broken away so that the internal construction may be viewed more clearly;

FIG. 5 is a plan view of the locking device of the present invention;

FIG. 6 is an end view of the locking device partly in section so that internal construction may be viewed;

FIG. 7 is a perspective view of the electrically-powered key;

FIG. 8 is an enlarged sectional view taken on line 8—8 of FIG. 4;

FIG. 9 is an enlarged view of a portion of the locking device taken on line 9—9 of FIG. 4;

FIGS. 10 and 11 are enlarged fragmentary sectional views taken on lines 10—10 of FIG. 9 and 11—11 of FIG. 8, respectively;

FIG. 12 is a perspective view of the releasable locking element for the device; and FIG. 13 is a perspective view of the indicia-bearing tag for use with the locking device of the present invention.

DETAILED DESCRIPTION OF SPECIFIC EMBODIMENTS

Referring now to the embodiments of the invention shown by way of example only in the various figures, FIG. 1 represents a portion of store premises where products are sold to customers, which has one or more entrances such as 10 through which customers are permitted to enter only, and one or more exits such as 12 by which customers may leave, with or without purchases. One or more check-out counters such as 14 are provided, past which each customer must travel on his way to an exit. Each check-out counter is provided with a cash register and data read-out unit such as 16, and at each counter which is in use there will be an operator such as 18. Each register and read-out unit 16 has an electrified key such as 20 connected thereto, the nature and use of which will be described in detail hereinafter. A central data processor 22 may be located on the premises, as in the manager's office 24, and is connected to each of the register and data read-out units 16 by appropriate electrical connections indicated by the broken lines 25, 25A. At each exit such as 12 there is located a detection station such as 28 for detecting unauthorized removal of products, and for producing an alarm indication of such unauthorized removal. In this example the construction and partitioning of the premises is such that, once a customer is within the premises, he must pass one of the check-out counters and one of the detection stations in order to leave again. It will be understood that preferably all possible exits from the store premises, including authorized employee exits, delivery entrances and exits, and even windows in some cases, are provided with detection stations such as 28.

Each protected product on the premises has a locking device 30 secured thereto, which is electrically releasable by application thereto of the electrified key 20. For example, in this case there is shown an iron 32 for the hand-ironing of clothes as an example of a product being sold on the premises, and the locking device is secured around the handle thereof. As shown in FIG. 2, in this embodiment of the invention the locking device has a pair of pivoted arms 34 and 36 which may be pivoted to the open position shown in full line in FIG. 2 after the device is unlocked, so that it may then be removed from the product. When the arms are moved to the closed position shown in broken line in FIG. 2, the device snaps into its locked condition and can only be released by the application of electric current thereto by the key 20. In FIG. 2, the element 38 represents the handle of the iron 32 mentioned above.

The locking device 30, as mentioned above, is such that its unauthorized removal past the detection station 28 will sound an alarm. There are a variety of means by which this can be provided, a number of which are known in the prior art and need not be described here in detail. For the purposes of the present description, it will be assumed that the locking device 30 contains a magnet 44, and that the detection station 28 includes appropriate magnetometer apparatus for detecting the passage of a magnet 44 past it.

Where the product happens to contain a convenient, relatively large, and secure opening through it as in the case of the iron 32, the arms 34, 36 of the locking device 30 may be positioned to extend through the opening and thereby encircle a secure portion of the product in a manner such that the locking device cannot be removed until it is opened. FIG. 3 shows a modification wherein arm 36a is provided with a set of narrow sharp teeth such as 46a which close into corresponding recesses 48a in the other arm 34a, and are adapted to pierce a fabric or similar mesh material without damaging it. In this way the device may be secured to such a mesh or fabric product and can only be removed therefrom by tearing of the product.

In the interest of clarity, FIG. 2 does not show the indicia-bearing tag in position in the locking device 30. An appropriate form of such tag is shown in FIG. 13, and the figures described later herein describe the manner of its use in detail. For the present purposes it is sufficient to point out that the tag has an indicia portion 50, a retaining slot 52, an externally visible portion 54, and a linear weakened portion 56 extending across it between the retaining slot and the external portion. When the locking device is open as shown in FIG. 2, the edge 58 of the tag is inserted into the slot 60 in the upper arm 34, the two arms 34 and 36 are then moved together until the retaining boss 64 enters the slot 52, the two arms are then closed together to their locked position. In this example the indicia portion of the tag comprises the two tracks 68 and 70, along which binary bits of information are positioned, for example in magnetic or optical form, which may comprise data representing an identifying number for the product and the selling price thereof. As will be explained in detail hereinafter, these binary bits are presented along the bottom of a keyway such that when the key 20 is positioned in the keyway and moved along into the position at the end of its travel where it provides electrical contact to release the locking member, read-out elements on the bottom of the key read out electrical signals representative of the bits of data on the tag. These signals are supplied to the central data processor 22. The external portion of the tag 54 may be written upon to indicate price, and may for example show one or more marked-down prices. The weekened portion 56 of the tag is provided so that, if one should pull at the exterior portion of the tag, it will be held by the retaining boss 64 and the tag will tear or break along the line 56 without removing the indicia portion from the interior of the locking device.

It will be appreciated that the arrangement described generally above not only provides security against unauthorized removal of the product from the premises, but also enables automatic monitoring of sales, inventory, or other information relevant to the products sold. Thus any product which can be removed from the premises through an exit without causing an alarm must have been separated from its locking device, and the locking device can only be separated after it is opened by application thereto of the key in a manner which automatically reads out the data contained therein. This data is automatically fed into the central data processor 22, where it can provide any desired form of accounting information. For example, it can give an instantaneous total over any selected period of time, and/or a running total, of dollar volume of sales of all products, or of particular types of products, or of the unit volume of particular products which have been sold. If desired the information so derived, or the raw data obtained from the individual register and read-out units, can be sent to a central computer unit at another location, into which similar information from a variety of other commonly-owned premises can also be fed, so as to provide similar data for all premises.

As will be described in detail hereinafter, the requirement of a key of a particular configuration, and the requirement of a certain electrical current to release the locking device, make it difficult for a would-be thief to release the locking device. As will also be described in detail hereinafter, the locking device is preferably made in a simple, convenient and inexpensive form, particularly as to the locking and unlocking arrangement which in accordance with one aspect of the invention comprises a bimetallic element heated by the applied current in order to effect unlocking of the locking device.

It will be appreciated that the locking device of the invention may in some cases be used only for its function of providing data as to the product to which it is secured, and in other cases may be used only for preventing theft. However, the maximum advantages of the invention are obtained in a locking device which provides both functions in a particularly simple, effective and inexpensive manner.

It will also be appreciated that the locking device itself need not necessarily encircle or penetrate a portion of the product to be secured. In some instances it may be more effective to place another element, such as a wire or a chain through a portion of the product, and to secure the protruding portions of the element to each other by means of the locking device.

It is also contemplated that portable detection means may be provided, similar in function to the detection station 28, which security personnel may carry with them on the premises to determine, for example, whether a shoplifter has secreted a secured product on his person without having to wait until the shoplifter passes a fixed detection station in order to make this determination.

Considering now more specifically the structural arrangement and details of the electrically releasable locking device 30 in accordance with the present invention, the device comprises male and female jaw members 112 and 114 respectively which are pivotal about a pivot pin 116 so that the device may be selectively actuated between a closed or locking position (broken lines of FIG. 2), and an open or release position (solid lines of FIG. 2). The male jaw member 112 as illustrated consists of a base portion 118 and an arcuate arm 36, and the female jaw member also comprises a base portion 122 and an arcuate arm 34, the arms being shaped to define a generally oval-shaped opening 125 of a size to embrace products or articles of merchandise to which the locking device is applied. The terminal end of the male arm 36 mounts a pin 126 which engages in a socket 128 in the female arm 34 in the closed or locked position to insure retention on an article until the locking device is released in the normal prescribed manner.

The base portions of the male and female jaw members are of reduced cross section to define web sections 132 and 134 respectively, providing a compact unit and also facilitating other features of the device discussed below. A spring-biased actuating pin 136 is mounted in the base portion of the male jaw member 112 and engages the web section 134 to normally pivot the jaw members relative to one another to an open position. Pivotal movement of the jaw members relative to one another is limited by means of a limit pin 140 mounted on the inner face of the web section 134 and which engages in an arcuate slot 142 in the inner wall of the web section 132 of the male jaw member. As illustrated, the pin abuts one end of the slot 142 to limit the open position of the jaw members and abuts the opposite end of the slot in the closed position.

The locking device 30 of the present invention further includes a locking element movable between a locking position wherein the arms of the jaw members are closed (FIG. 4) to embrace an article and a release position wherein the arms of the jaw members are open (FIG. 2) to permit removal of the device from an article. More specifically, the locking element is a contoured locking pin 150 mounted at the free end of a movable actuating lever 152 which in turn is mounted on a post 154 carried by a face of cover plate 156 serving as a cover for a pocket or cavity 158 in the web section of the female jaw member. A keeper hole 160 is formed in the inner wall of the male jaw web section to receive the locking pin 150 when the jaw members are in a closed position. Note that the face plate has an opening 164 to accommodate the locking pin. The cover plate 156 is secured in place over the pocket 158 by conventional screw fasteners 165 and as noted mounts various elements of the locking device to facilitate ease of assembly and to permit ready disassembly, for example to replace parts if necessary.

In the present instance, the actuating lever 152 for the locking pin is a bimetallic strip which conventionally consists of at least a pair of strips of different metals or alloys fused together and having different temperature coefficients of expansion. At normal or room temperature the strip has a straight configuration whereby the locking pin 150 engages in the keeper hole if aligned therewith, and at a predetermined elevated temperature the strip assumes a deflected configuration to pivot the locking pin to a release position. Means is provided for controllably passing a heating current of electricity through the bimetallic actuating lever 152 to selectively control actuation of the locking means. To this end, there is provided an electrically-conductive contact arm 169 in the form of a leaf spring which at one end is secured to the face plate 156 as at 171, and at its outer free end normally engages the underside of the bimetallic strip 152. The contact arm 169 is contoured to maintain engagement with the actuating lever 152 during initial deflection of lever 152 and is connected to one contact 173 of a plug 175 disposed at the inner end of channel 162 in the female jaw member by an electrical lead 179. The other contact 181 of the plug 175 is connected to the bimetallic actuating lever 152 by an electrical lead 183. Bending movement of the contact arm 169 is limited by a limit pin 185 having an insulated head mounted on the face plate so that when the bimetallic strip has been heated sufficiently to move to its release position, the arm 169 will not follow the lever further, and electrical contact between the arm and lever is thereby broken. As explained hereinafter, this terminates current through, and heating of, the bimetallic strip to avoid the possibility of overheating thereof.

The key 20, as best illustrated in FIGS. 7, 9 and 10, is of generally block-like shape and mounts at least one, and in the present instance two, side-by-side read-out elements 191 adjacent its bottom face, which are connected through suitable electrical leads 193, 193a and 193b to the read-out unit 16. By this arrangement as the key 20 is moved along the channel 162 the read-out elements 191 traverse the tracks 68 and 70 and read out electrical signals representative of bits of data on the tag thereby to supply the same to read-out unit 16 and thence to the central data processor 22. The key is also provided with a socket-like opening 195 in its front face and mounted therein in recessed position are a pair of contacts 197, 197a connected to a suitable source of electrical power through leads 199, 199a. Thus, when the key 20 is moved to the inner end of channel 162 the contacts 197, 197a engage the plug contacts 173 and 181 to complete the circuit to the bimetallic lever which then is heated by the applied current thereby to pivot the locking pin to a release position which in turn permits the arms to pivot relative to one another to an open position. After the operator removes the key, the bimetallic strip cools so that the locking element 150 is urged into the keeper chamber when the locking device is released.

The electrically releasable locking device of the present invention is designed to mount an information tag T generally of the type shown in FIG. 10, the tag T having an indicia portion 50 and an exposed portion 54 separated by a score line 56. This tag is adapted to be supported in the releasable locking device in a manner whereby the indicia portion 50 can be read by the electrified key when desired and also in a manner preventing this portion of the tag from being removed by unauthorized personnel. To this end, the channel 162 is open at its outer end as at 163 to permit insertion of the key and has a pair of confronting ways 162a in the opposing sidewalls to receive the guide shoes 201 projecting from opposed sides of the key to correctly and accurately position the key during movement in the channel. An elongated slot 60 is provided to one side of the base of the channel 162 within which the lead edge of the tag T seats. This arrangement keeps the tag in a fixed position in the channel as it is traversed by the electrified key.

Additionally, as illustrated, the tag T is locked in place by means of a detent or boss 64 projecting from the upper edge of the male jaw member web section which engages in a slotted opening 172 in the base section of the female jaw member. The lug as illustrated in the closed position engages through a window-like opening 52 in the tag T when the jaws are closed so that the exposed portion 54 extends beyond the side edge of the locking device. It is noted that the detent 64 is offset to insure that the information tag is inserted in the proper position with the coded information exposed in the proper order in the channel and to prevent locking jaw members unless the card is in the correct position. Additionally, the window opening 52 is of a peripheral dimension greater than the dimension of the detent so that the detent readily passes through the window-like opening and does not jam the device. As illustrated, the score line 56 separating the coded side from the exposed side of the tag T lies within the confines of the locking device when it is closed. Accordingly, if someone tries to remove the tag, the tag will be severed along the score line 56 and the code portion remains intact.

In the modified embodiment shown in FIG. 3, in order to prevent the jaw members from binding on the material M to which it is applied and present the possibility of jamming the locking pin, suitable means is preferably provided to maintain the spacing between the end faces of the terminal ends of the arms to provide a gap as shown. Of course, this can be accomplished in the device described above by means of the limit pin 140 and slot 142. Additionally, the base portions may be suitably designed to have interengaging shoulders in the inner-limit position of the jaw members.

In the overall operation and use of the apparatus and system described, the tag T is prepared with data appropriate to the particular product to be protected laid down along the two tracks 68 and 70, for example by magnetic recording of appropriately-coded binary information upon strips of magnetic material laid upon the two tracks, or by the printing of dots or bars of optically-readable binary information. As mentioned above, in one typical example these data may comprise coded information as to the nature of the product and the selling price thereof. A clip such as that shown in FIG. 2 or 3 is provided in its open condition, and then closed around or through a portion of the product until the locking element 150 falls into its keeper chamber 164. Just prior to closing the locking device on the product, the tag T is placed so that the opening or slot 52 fits over the boss 64 of the locking device, and so that when closed the tag is secured to, and partially within, the locking device with the data-bearing tracks 68 and 70 disposed along the bottom of the channel 162 with the data indicia facing upward. Either before or after closing of the locking device, any desired visually-observable information is placed on the exterior portion 54 of the tag. If for any reason the locking device has been closed to its locked position prior to its application to a product, it may be re-opened by application to it of an electrified key like that shown in FIG. 7, at any convenient location on the premises.

If a person then attempts to remove the product from the premises unauthorizedly, as by shoplifting or employee theft, on carrying out the product past a detection station such as 28 the detection station will sense the presence of the magnet 44 in the locking device and sound or show an appropriate alarm. If instead a customer is making a legitimate purchase of the product, he will carry it to the operator at the check-out counter 14. The operator will then take his electrified key 20, place it into the open end of channel 162, and slide it along that channel to the end thereof. In the latter position the contacts 197, 197a recessed therein will mate and make electrical contact with the contacts 173 and 181 of the plug 175. Electrical voltage supplied from the data read-out unit 116 to the contacts 197, 197a is thereby transmitted through the wire 183 to one end of the bimetallic actuating lever 152, and through the wire 179 and leaf-spring contact arm 169 to a point near the opposite end of the actuating lever. The voltage thus supplied by the electrified key is preferably sufficient to produce a relatively high current through the bimetallic actuating lever, sufficient to heat it rapidly, e.g. in one or two seconds, to the temperature for which it moves the locking element 150 to its release position permitting the locking device to spring open and to be removed from the product.

As the key is moved along the channel 162 toward its unlocking position, the read-out elements 191, supplied with appropriate operating current from the read-out unit 16, move over and along the two data-bearing tracks 68 and 70, reading out binary electrical information as they go, over the wires leading therefrom to the read-out unit 16. Suitable "start" and "end" codes may be employed along the tracks so that reading only occurs while removing the key from the channel. Such data-storing and read-out elements and systems being well known in the art, it has not been necessary to describe them here in detail.

The data read out into the unit 16 may be visually displayed thereon, at least as to the selling price data, and if desired the unit 16 may include suitable adding arrangements so that a number of products bought by the same customer may be removed from their respective locking devices and the sales prices totaled at the read-out unit, as in the ordinary adding cash register. The product-identifying data may be accumulated and stored in each of the read-out units 16 so that one can determine what products, and how many, where checked out at a given checkout counter, and the data from the unit 16 are also preferably supplied to the central data processor 22 for producing whatever types of inventory control, sales information or the like are desired by the owner or operator of the premises.

It is noted that to unlock the locking device requires a key of a particular form, which key must also be appropriately electrified, and it is therefore difficult for an unauthorized person to remove the locking device from a product. The tear-type tag prevents the removal of the data-bearing portion of the tag so that each product sold will in fact have its appropriate coded data contained therein for read out when the product is sold even though the external portion of the tag may have been torn off. The recessed arrangement of the contacts 197 and 197a prevents accidental electrical shock from handling the key. The bimetallic unlocking arrangement not only contributes to the difficulty of an unauthorized opening of the locking device, but is much less expensive than normal, relatively-complicated mechanical arrangements and also considerably more reliable and inexpensive than a solenoid-type arrangement for this purpose would be.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. A method of monitoring a product to be sold and then removed from store premises comprising:
   inserting into an electrically-releasable locking device data-representative indicia relating to a particular product, which data can be automatically read out in the form of electrical signals;
   securing said locking device to said product in its locked condition on said premises;
   providing a detection station at a check-point on said premises to provide an alarm if said product is removed past said check-point with said locking device attached thereto;
   electrically-releasing said locking device from said product upon sale of said product on said premises, and in the same operation automatically reading out said data in the form of electrical signals and transferring them to an electrical data processor.

2. A product-monitoring system comprising:
   an enclosed product-dispensing station having at least one exit;
   an electrically-releasable locking device adapted to be locked to a product in said station, said locking device being detectable upon unauthorized removal past a predetermined checkpoint at said station, said locking device containing data relating to said product;
   an electrically-powered key operative to release said locking device when applied thereto at said station, to permit removal of said device from said product and subsequent authorized removal of said product past said check-point;
   said key having means thereon for detecting said data and converting them to data-representing electrical signals while said key is applied to said locking device; and
   electrical data processing means supplied with said data-representing electrical signals for processing said data.

3. A system as claimed in claim 2 wherein said electrically releasable locking device includes:
   a pair of relatively movable members;
   a locking element movable between a locking position in which said members are locked together and a release position in which said members are unlocked from each other to permit relative motion thereof;
   bimetallic means having different configurations at different temperatures for controlling movement of said locking element from one of said positions to the other thereof; and
   means for controlledly applying an electrical current to said bimetallic means to change its temperature and thereby control the locking and unlocking of said members.

4. A system as claimed in claim 2 wherein said electrically releasable locking device includes a pair of pivotally mounted members operable between a locking position in which said members are locked together and a release position in which said members are unlocked from each other.

5. A system as claimed in claim 4 wherein one of said members has a channel formed therein for said key and an indicia-bearing tag mountable in said device with the indicia portion of said tag exposed in said channel whereby said indicia portion can be read by sad key when said key traverses said channel.

6. A releasable locking device adapted to be secured to a product, comprising:
   a pair of relatively movable members;
   a locking element movable between a locking position in which said members are locked together and a release position in which said members are unlocked from each other to permit relative motion thereof;
   bimetallic means having different configurations at different temperatures for controlling movement of said locking element from one of said positions to the other thereof;
   means for controlledly applying an electrical current to said bimetallic means to change its temperature and thereby control the locking and unlocking of said members; and
   biasing means normally urging said members to the release position.

7. A releasable locking device adapted to be secured to a product, comprising:
   a pair of relatively movable members;
   a locking element movable between a locking position in which said members are locked together and a release position in which said members are unlocked from each other to permit relative motion thereof;
   bimetallic means having different configurations at different temperatures for controlling movement of said locking element from one of said positions to the other thereof;
   means for controlledly applying an electrical current to said bimetallic means to change its temperature and thereby control the locking and unlocking of said members; and
   means for mounting an indicia-bearing tag, said mounting means operable to restrain at least a portion of the tag from being removed from the device when it is in the locking position.

8. A locking device as claimed in claim 7 wherein said restraining means includes a slotted opening in one of said members and a retaining boss on the other of said members engageable in said slotted opening when the members are in a locking position, said boss engaging through a retaining slot in the indicia-bearing tag.

9. A releasable locking device adapted to be secured to a product, comprising:
   a pair of relatively movable members;
   a locking element movable between a locking position in which said members are locked together and a release position in which said members are unlocked from each other to permit relative motion thereof;
   bimetallic means having different configurations at different temperatures for controlling movement of said locking element from one of said positions to the other thereof;

means for controlledly applying an electrical current to said bimetallic means to change its temperature and thereby control the locking and unlocking of said members;

wherein said members include a pair of arms, one of said arms mounting at its terminal end at least one pin member engageable in at least one socket in the terminal end of the other arm.

10. A releasable locking device adapted to be secured to a product, comprising:

a pair of relatively movable members;

a locking element movable between a locking position in which said members are locked together and a release position in which said members are unlocked from each other to permit relative motion thereof;

bimetallic means having different configurations at different temperatures for controlling movement of said locking element from one of said positions to the other thereof;

means for controlledly applying an electrical current to said bimetallic means to change its temperature and thereby control the locking and unlocking of said members;

wherein said members include a pair of arms, one of said arms being provided with a plurality of sharp teeth engageable in corresponding recesses in the other arm.

11. A theft-prevention clip adapted to be releasably secured to an article, comprising:

a pair of relatively movable members having a closed position in which said clip is secured to said article and having an open position in which said clip is released from said article;

locking means operable between a locking condition in which said members are locked in said closed position and a release condition in which said members are free to move to said open position;

said locking means comprising bimetallic means having a first configuration, at ambient temperatures, in which it maintains said locking means in said locking condition, and having a second configuration at elevated temperatures in which it causes said locking means to move to said release condition;

electrical quick-disconnect means; and means responsive to a current supplied to said quick-disconnect means for heating said bimetallic means to elevate its temperature and cause said locking means to be operated to said release condition.

12. The clip of claim 11, in which said last-named means comprises means for passing said current through said bimetallic means.

13. The clip of claim 11, comprising permanent-magnet means secured to said clip.

14. The clip of claim 11, in which said bimetallic means is mounted on one of said members, said clip comprising a locking surface integral with said bimetallic means which engages a portion of the other of said members when said locking means is in said locking condition and which is disengaged from said other member when said locking means is in said release condition.

15. The clip of claim 11 wherein said bimetallic means is mounted on one of said members and carries a locking pin engagable in a keeper hole in the other member, and including means for supplying current to said bimetallic means including an electrically-conductive contact arm operable to normally maintain engagement with said bimetallic means.

16. The clip of claim 15 wherein said contact arm is contoured to maintain engagement with said bimetallic means during movement thereof between said first and second configurations, and including limit means operable to effect disengagement of said bimetallic means and contact arm after said bimetallic means has attained said second configuration.

17. A releasable locking device as claimed in claim 11 wherein said members are pivotally mounted relative to one another and means is provided for limiting pivotal movement of said members.

18. A releasable locking device as claimed in claim 17 wherein said means limiting said pivotal movement includes a limit pin carried by one of said members engageable in a slot in the other of said members.

References Cited

UNITED STATES PATENTS

| | | | |
|---|---|---|---|
| 3,350,542 | 10/1967 | Getman | 292—DIG. 66 |
| 3,458,675 | 7/1969 | Gaudio | 337—92 |
| 2,746,679 | 5/1956 | Stratton et al. | 235—61.6 R |
| 3,413,447 | 11/1968 | Mers | 235—61.6 R |
| 3,121,159 | 2/1964 | Rogal | 235—61.6 R |
| 2,774,060 | 12/1956 | Thompson | 340—280 |

JOHN W. CALDWELL, Primary Examiner

G. R. SWANN III, Assistant Examiner

U.S. Cl. X.R.

235—61.6 R; 292—DIG. 66; 337—75